(12) United States Patent
Van Hamersveld

(10) Patent No.: US 10,856,151 B2
(45) Date of Patent: Dec. 1, 2020

(54) RADIO MANAGEMENT BASED ON USER INTERVENTION

(71) Applicant: BandwidthX Inc., Carlsbad, CA (US)

(72) Inventor: Chris Van Hamersveld, San Marcos, CA (US)

(73) Assignee: BANDWIDTHX INC., Carlsbad, CA (US)

(*) Notice: Subject to any disclaimer, the term of this patent is extended or adjusted under 35 U.S.C. 154(b) by 156 days.

(21) Appl. No.: 15/848,651

(22) Filed: Dec. 20, 2017

(65) Prior Publication Data
US 2018/0184299 A1    Jun. 28, 2018

Related U.S. Application Data
(60) Provisional application No. 62/439,418, filed on Dec. 27, 2016.

(51) Int. Cl.
| | |
|---|---|
| *H04W 48/02* | (2009.01) |
| *H04W 12/08* | (2009.01) |
| *H04W 76/38* | (2018.01) |
| *H04L 29/06* | (2006.01) |

(52) U.S. Cl.
CPC ........... *H04W 12/08* (2013.01); *H04L 63/101* (2013.01); *H04W 48/02* (2013.01); *H04W 76/38* (2018.02)

(58) Field of Classification Search
CPC .............................. H04W 76/38; H04W 84/12
See application file for complete search history.

(56) References Cited

U.S. PATENT DOCUMENTS
| | | |
|---|---|---|
| 6,870,822 B2 | 3/2005 | Balogh |
| 7,003,311 B2 | 2/2006 | Ebata et al. |
| 7,505,795 B1 | 3/2009 | Lim et al. |
| 7,808,960 B1 | 10/2010 | Chan et al. |
| 8,036,367 B2 | 10/2011 | Baluja et al. |
| 8,116,285 B1 | 2/2012 | Barnum |
| 8,228,861 B1 | 7/2012 | Nix |

(Continued)

FOREIGN PATENT DOCUMENTS
| | | |
|---|---|---|
| CN | 1535045 A | 10/2004 |
| CN | 101388814 A | 3/2009 |

(Continued)

OTHER PUBLICATIONS
Extended European Search Report for related EP Patent Application No. 18151712.9, dated Jul. 5, 2018, in 10 pages.

(Continued)

*Primary Examiner* — Dai Phuong
(74) *Attorney, Agent, or Firm* — Procopio, Cory, Hargreaves & Savitch LLP

(57) ABSTRACT

Systems, methods, and media for radio management based on user intervention. In an embodiment, at least one user intervention is detected in the automated radio management of a radio system. In response, the automated radio management is restricted for at least a predetermined time period by one or both of turning off the automated radio management of the radio system, and adding an access point, to which the radio system was connected at a time of the at least one user intervention, to a blacklist. After the predetermined time period has expired, the restriction to the automated radio management is reversed.

17 Claims, 5 Drawing Sheets

(56) References Cited

U.S. PATENT DOCUMENTS

| | | |
|---|---|---|
| 8,494,559 B1 | 7/2013 | Malmi |
| 8,635,335 B2 | 1/2014 | Raleigh et al. |
| 8,711,866 B2 | 4/2014 | Shmueli et al. |
| 9,084,179 B2 | 7/2015 | Visuri et al. |
| 9,497,680 B1 | 11/2016 | Tran et al. |
| 2002/0181417 A1 | 12/2002 | Malhotra et al. |
| 2003/0003868 A1 | 1/2003 | Juurikko |
| 2003/0061363 A1 | 3/2003 | Bahl et al. |
| 2003/0179135 A1 | 9/2003 | Louhi |
| 2003/0182556 A1 | 9/2003 | Sunder et al. |
| 2003/0204703 A1 | 10/2003 | Rajagopal et al. |
| 2003/0232615 A1 | 12/2003 | Kim et al. |
| 2004/0156372 A1 | 8/2004 | Hussa |
| 2004/0202141 A1 | 10/2004 | Sinivaara et al. |
| 2004/0224665 A1 | 11/2004 | Kokubo |
| 2004/0255008 A1 | 12/2004 | Olsen et al. |
| 2005/0055371 A1 | 3/2005 | Sunder et al. |
| 2005/0153692 A1 | 7/2005 | Hwang et al. |
| 2005/0255865 A1 | 11/2005 | Sillasto et al. |
| 2005/0271021 A1 | 12/2005 | Alemany et al. |
| 2006/0002342 A1 | 1/2006 | Lin |
| 2006/0038696 A1 | 2/2006 | Almada et al. |
| 2006/0072493 A1 | 4/2006 | Ginzburg et al. |
| 2006/0104205 A1 | 5/2006 | Strutt et al. |
| 2006/0166669 A1 | 7/2006 | Claussen |
| 2007/0030857 A1 | 2/2007 | Fulknier et al. |
| 2007/0140157 A1 | 6/2007 | Fu et al. |
| 2007/0165593 A1 | 7/2007 | Hundal et al. |
| 2007/0171881 A1 | 7/2007 | Zhang et al. |
| 2007/0185804 A1 | 8/2007 | Cordoba |
| 2007/0213101 A1 | 9/2007 | Oh et al. |
| 2007/0249291 A1 | 10/2007 | Nanda et al. |
| 2008/0057956 A1 | 3/2008 | Black et al. |
| 2008/0075051 A1 | 3/2008 | Dundar et al. |
| 2008/0137622 A1 | 6/2008 | Russell |
| 2008/0176571 A1 | 7/2008 | Choi |
| 2008/0293404 A1 | 11/2008 | Scherzer et al. |
| 2009/0003242 A1 | 1/2009 | Tinnakomsrisuphap et al. |
| 2009/0004979 A1* | 1/2009 | Hsu .................. H04W 72/1215 455/115.3 |
| 2009/0028120 A1 | 1/2009 | Lee |
| 2009/0098869 A1 | 4/2009 | Torrance et al. |
| 2009/0180451 A1 | 7/2009 | Alpert et al. |
| 2009/0203352 A1 | 8/2009 | Fordon et al. |
| 2009/0239574 A1 | 9/2009 | Hussain |
| 2009/0245176 A1 | 10/2009 | Balasubramanian et al. |
| 2010/0085938 A1 | 4/2010 | Chen et al. |
| 2010/0091669 A1 | 4/2010 | Liu et al. |
| 2010/0103844 A1 | 4/2010 | Kim |
| 2010/0177673 A1* | 7/2010 | Yoon ................. H04W 52/0209 370/311 |
| 2010/0195632 A1 | 8/2010 | Prabhu |
| 2010/0202323 A1 | 8/2010 | Nishida et al. |
| 2010/0226299 A1 | 9/2010 | Sumida et al. |
| 2010/0240352 A1 | 9/2010 | Suri et al. |
| 2010/0296441 A1 | 11/2010 | Barkan |
| 2011/0060839 A1 | 3/2011 | Ohta et al. |
| 2011/0088080 A1 | 4/2011 | Stupar et al. |
| 2011/0110282 A1 | 5/2011 | Wu et al. |
| 2011/0111708 A1 | 5/2011 | Tu et al. |
| 2011/0158143 A1 | 6/2011 | Yun et al. |
| 2011/0171909 A1 | 7/2011 | Jung et al. |
| 2011/0194532 A1 | 8/2011 | Kakkad |
| 2011/0246281 A1 | 10/2011 | Satyavolu et al. |
| 2011/0263214 A1 | 10/2011 | Robinson et al. |
| 2011/0286437 A1 | 11/2011 | Austin et al. |
| 2011/0294539 A1 | 12/2011 | Shin et al. |
| 2011/0310840 A1 | 12/2011 | Kennedy et al. |
| 2011/0320588 A1 | 12/2011 | Raleigh |
| 2012/0026992 A1 | 2/2012 | Navda et al. |
| 2012/0047269 A1 | 2/2012 | Leonov et al. |
| 2012/0099495 A1 | 4/2012 | Mitra et al. |
| 2012/0140651 A1 | 6/2012 | Nicoara et al. |
| 2012/0157156 A1 | 6/2012 | Han et al. |
| 2012/0170513 A1 | 7/2012 | Vogedes et al. |
| 2012/0170556 A1 | 7/2012 | Tsfati et al. |
| 2012/0176929 A1 | 7/2012 | Choi |
| 2012/0176946 A1 | 7/2012 | Hunt et al. |
| 2012/0230193 A1 | 9/2012 | Fang |
| 2012/0257558 A1 | 10/2012 | Shin et al. |
| 2012/0258726 A1 | 10/2012 | Bansal et al. |
| 2012/0270538 A1 | 10/2012 | Meylan et al. |
| 2013/0007853 A1 | 1/2013 | Gupta et al. |
| 2013/0022024 A1 | 1/2013 | Chu et al. |
| 2013/0090115 A1 | 4/2013 | Deivasigamani et al. |
| 2013/0100819 A1 | 4/2013 | Anchan et al. |
| 2013/0100928 A1 | 4/2013 | Matsumori et al. |
| 2013/0100944 A1 | 4/2013 | Kwon et al. |
| 2013/0208713 A1* | 8/2013 | Hamade ................ H04W 48/18 370/338 |
| 2013/0262850 A1 | 10/2013 | Canpolat et al. |
| 2013/0272285 A1 | 10/2013 | Goldsmith et al. |
| 2013/0281154 A1 | 10/2013 | Aerrabotu |
| 2013/0322316 A1 | 12/2013 | Hara et al. |
| 2014/0026192 A1 | 1/2014 | Gatewood et al. |
| 2014/0113628 A1 | 4/2014 | Sundararajan et al. |
| 2014/0129385 A1 | 5/2014 | Anderson et al. |
| 2014/0133297 A1 | 5/2014 | Raleigh et al. |
| 2014/0220967 A1 | 8/2014 | Pankajakshan et al. |
| 2014/0274035 A1 | 9/2014 | Unger et al. |
| 2014/0286326 A1 | 9/2014 | Jang et al. |
| 2014/0287775 A1 | 9/2014 | Kawai |
| 2014/0293829 A1 | 10/2014 | Visuri et al. |
| 2015/0003422 A1 | 1/2015 | Jin et al. |
| 2015/0103177 A1 | 4/2015 | Slamka |
| 2015/0139074 A1* | 5/2015 | Bane .................... H04W 48/08 370/328 |
| 2015/0257038 A1 | 9/2015 | Scherzer |
| 2016/0037298 A1 | 2/2016 | Park et al. |
| 2016/0037367 A1* | 2/2016 | Li ........................ H04W 12/02 370/312 |
| 2016/0119850 A1 | 4/2016 | Kimura et al. |
| 2016/0127152 A1 | 5/2016 | Balwani |
| 2016/0157131 A1 | 6/2016 | Chaudhuri et al. |
| 2016/0183058 A1 | 6/2016 | Nicosa |
| 2016/0219475 A1 | 7/2016 | Kim |
| 2016/0227591 A1 | 8/2016 | Oh et al. |
| 2016/0262201 A1 | 9/2016 | Visuri et al. |
| 2016/0302035 A1 | 10/2016 | Kiskani et al. |
| 2016/0330635 A1* | 11/2016 | Chhabra ................ H04W 4/80 |
| 2017/0251440 A1* | 8/2017 | Gilson ............... H04W 52/028 |
| 2017/0353859 A1 | 12/2017 | Idnani et al. |

FOREIGN PATENT DOCUMENTS

| | | |
|---|---|---|
| CN | 101523932 A | 9/2009 |
| CN | 101600240 A | 12/2009 |
| CN | 101616452 A | 12/2009 |
| CN | 101616463 A | 12/2009 |
| CN | 101715228 A | 5/2010 |
| CN | 102685750 A | 9/2012 |
| CN | 102932771 A | 2/2013 |
| CN | 103402190 A | 11/2013 |
| EP | 1926283 A1 | 5/2008 |
| EP | 2170003 A2 | 3/2010 |
| EP | 2341738 A1 | 7/2011 |
| EP | 2421331 A1 | 2/2012 |
| KR | 1020040025222 A | 3/2004 |
| KR | 1020110045885 A | 5/2011 |
| WO | 2006126062 A2 | 11/2006 |
| WO | 2009157171 A1 | 12/2009 |
| WO | 20110149533 A1 | 12/2011 |
| WO | 2013184110 A1 | 12/2013 |
| WO | 2014022069 A1 | 2/2014 |

OTHER PUBLICATIONS

International Search Report and Written Opinion for related international application No. PCT/US2017/067378, dated Apr. 13, 2018.
International Search Report and Written Opinion for related international application No. PCT/US2017/066965, dated Apr. 16, 2018.
International Search Report and Written Opinion for related international application No. PCT/US2017/067522, dated Apr. 16, 2018.

(56) References Cited

OTHER PUBLICATIONS

International Search Report and Written Opinion for related international application No. PCT/US2017/067523, dated Apr. 16, 2018.
International Search Report and Written Opinion for related international application No. PCT/US2017/067524, dated Apr. 12, 2018.
Office Action and Search Report dated May 3, 2018 for related CN Patent Application No. 201480028997X in 9 pages.
Extended European Search Report for related EP Patent Application No. 12851159.9, dated Jul. 14, 2015.
Extended European Search Report for related EP Patent Application No. 14773816.5, dated Oct. 24, 2016.
Extended European Search Report for related EP Patent Application No. 16187937.4, dated Nov. 14, 2016.
International Search Report and Written Opinion for related international application No. PCT/US2012/066389, dated Mar. 18, 2013.
International Search Report and Written Opinion for related international application No. PCT/US2014/031912, dated Jul. 31, 2014.
Office Action and Search Report dated May 3, 2017 for related CN Patent Application No. 2012800579653.
Office Action and search report for related CN Patent Application No. 2017114331516, dated Apr. 15, 2020, in 8 pages.
Extended European Search Report for related EP Patent Application No. 17883221.8 dated Jun. 16, 2020 in 19 pages.
Office Action dated Jun. 26, 2020 for related U.S. Appl. No. 15/845,410, in 33 pages.

\* cited by examiner

500

RADIO MANAGEMENT BASED ON USER INTERVENTION

CROSS-REFERENCE TO RELATED APPLICATIONS

The present application claims priority to U.S. Provisional Patent Application No. 62/439,418, filed on Dec. 27, 2016, which is hereby incorporated herein by reference as if set forth in full.

BACKGROUND

Field of the Invention

The embodiments described herein are generally directed to radio management, and, more particularly, to managing a radio within a mobile device based on user intervention.

Description of the Related Art

In general, radio management has been improved to include triggers that will cause the radio to turn on and perform a scan. Previously, radio management used a variable scheduling mechanism to decide when to scan for a connection opportunity. With these new triggers, connections are timelier, since the triggers look for those times when the device is likely at a destination where a Wi-Fi™ connection may be possible.

However, a big source of complaints from users is a feeling that they have lost control of the Wi-Fi™ on their mobile devices. Typically, the only remedy is for the users to turn off the radio management service, which means that it may never run again.

SUMMARY

Accordingly, systems, methods, and media are disclosed for radio management based on user intervention.

In an embodiment, a method is disclosed for a mobile device comprising a first radio system and a second radio system and capable of performing radio management of at least the second radio system. The method comprises using at least one hardware processor to: detect at least one user intervention in the automated radio management of the second radio system; in response to the detection of the at least one user intervention, automatically restrict the automated radio management of the second radio system for at least a predetermined time period, by one or both of turning off the automated radio management of the second radio system, and adding an access point, to which the second radio system was connected at a time of the at least one user intervention, to a blacklist; and, after the predetermined time period has expired, automatically reverse the restriction to the automated radio management of the second radio system. The method may be embodied in executable software modules of a processor-based system, such as a mobile device, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for radio management based on user intervention. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
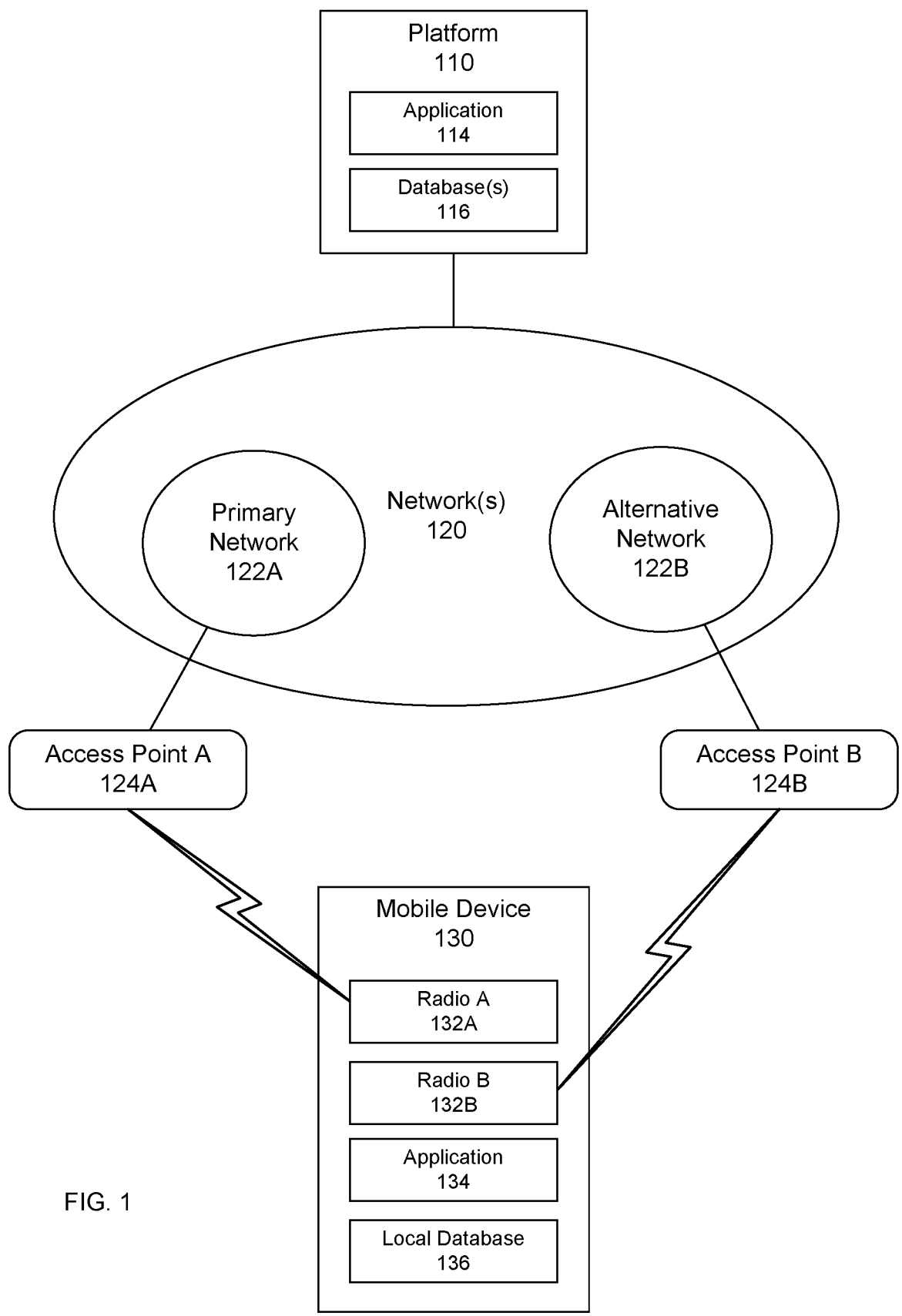
FIG. 1 illustrates an example infrastructure, in which one or more of the processes described herein, may be implemented, according to an embodiment.

FIG. 1 illustrates an example system in which automated discovery of amenities may occur, according to an embodiment. The infrastructure may comprise a platform 110 (e.g., one or more servers) which hosts and/or executes one or more of the various functions, processes, methods, and/or software modules described herein. Platform 110 may comprise or be communicatively connected to a server application 114 and/or one or more databases 116. Platform 110 may comprise dedicated servers, or, alternatively, cloud instances which utilize shared resources of one or more servers. Platform 110 may comprise collocated and/or distributed servers or cloud instances. While only one server application 114 and one set of database(s) 116 are illustrated, it should be understood that the infrastructure may comprise any number of server applications and databases. Platform 110 may be communicatively connected to one or more mobile devices 130 via one or more networks 120.

Network(s) 120 may comprise the Internet, wireless communication networks, local home networks, any other network, and/or any combination of networks. As illustrated, network(s) 120 comprise or are communicatively connected to a primary network 122A and an alternative network 122B. In an embodiment, each of primary network 122A and alternative network 122B comprises a wireless communication network which communicates with a radio of mobile device(s) 130 via a wireless communication protocol. For example, primary network 122A may comprise a cellular network which utilizes 2G (e.g., GSM, GPRS, EDGE, iDEN, TDMA, CDMA), 3G (e.g., CDMA2000, 1×-EVDO, WCDMA, UMTS, HSPA), 4G (e.g., LTE, LTE-A), 5G, etc., whereas alternative network 122B may comprise a Wi-Fi™ network (e.g., one or more of the family of 802.11 standards from The Institute of Electrical and Electronic Engineers (IEEE)).

Mobile device(s) 130 may comprise any type or types of computing devices capable of wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and the like. In an embodiment, each mobile device 130 comprises a first radio system 132A, a second radio system 132B, a client application 134, and a local database 136. Mobile device 130 may be configured to turn on or off one or both of the first and second radio systems 132A and 132B independently of each other. First radio system 132A uses a first wireless communication protocol (e.g., a protocol used for a cellular network) to wirelessly connect to an access point 124A (e.g., a cellular base station serving a sector of a cellular network), which provides access to primary network 122A. Second radio system 132B uses a second wireless communication protocol (e.g., Wi-Fi™) to wirelessly connect to an access point 124B (e.g., a Wi-Fi™ access point), which provides access to alternative network 122B. It should be understood that the first wireless communication protocol may be different from the second wireless communication protocol.

As used herein, the term "application" may refer to any executable software module or library of software modules that exists on platform 110 (e.g., as server application 114), mobile device 130 (e.g., as client application 134), or both platform 110 and mobile device 130 (e.g., with some functions executed, as modules of server application 114, on platform 110, and some functions executed, as modules of client application 134, on mobile device 130).

Any of the software modules or other components described herein may take a variety of forms. For example, a component may be a stand-alone software package, or it may be a software package incorporated as a "tool" in a larger software product. It may be downloadable from a network (e.g., from a website) as a stand-alone product or as an add-in package for installation in an existing software application or operating system. It may also be available as a client-server software application, as a web-enabled software application, and/or as a mobile application.

1.2. Example Processing Device

Figure 2:
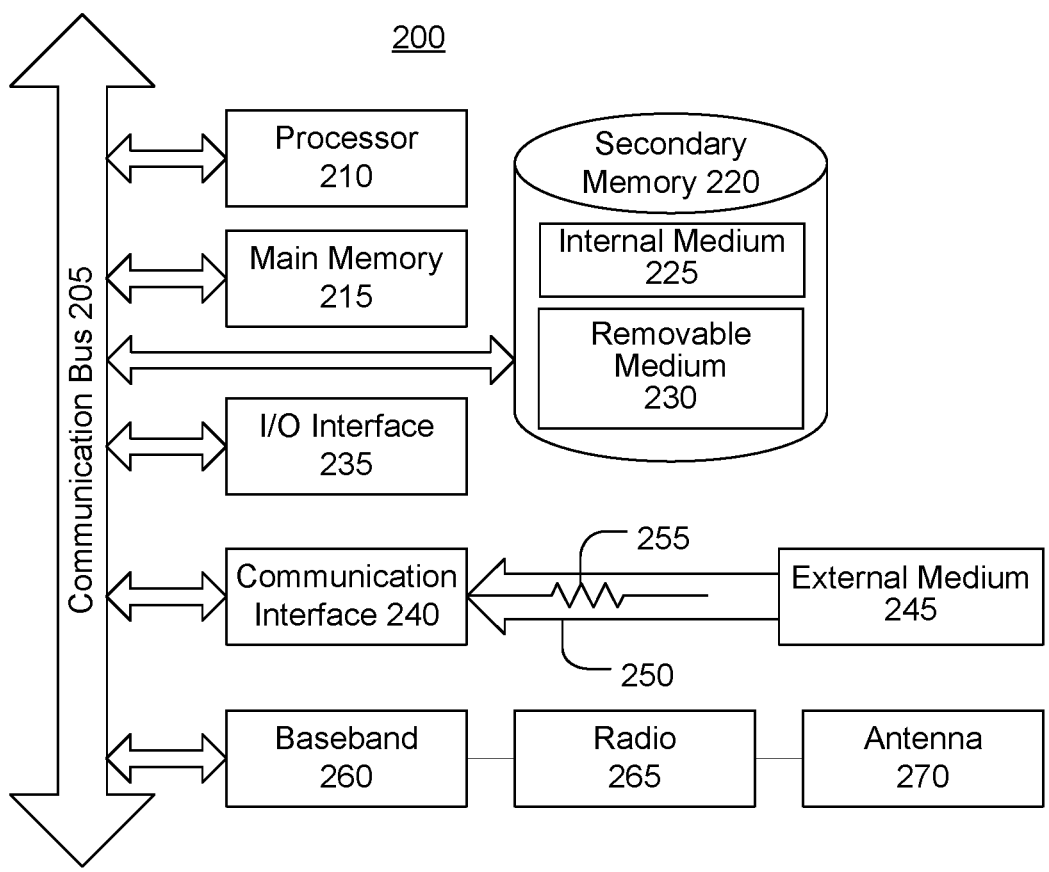
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example system 200 may be used as or in conjunction with one or more of the mechanisms, processes, methods, or functions (e.g., to store and/or execute the application or one or more software modules of the application) described herein, and may represent components of platform 110, mobile device(s) 130, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 200 preferably includes a main memory 215 and may also include a secondary memory 220. Main memory 215 provides storage of instructions and data for programs executing on processor 210, such as one or more of the functions and/or modules discussed above. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, etc.

Removable storage medium 230 is a non-transitory computer-readable medium having stored thereon computer-executable code (e.g., disclosed software modules) and/or data. The computer software or data stored on removable storage medium 230 is read into system 200 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 may include an external hard disk drive, an external optical drive, an external magneto-optical drive, etc. Other examples of secondary memory 220 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code (e.g., software and computer programs) to system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform the features and functions described elsewhere herein.

In an embodiment, I/O interface 235 provides an interface between one or more components of system 200 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In one embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also codes the digital signals for transmission and generates a baseband transmit audio signal that is routed to the modulator portion of radio system 265. The modulator mixes the baseband transmit audio signal with an RF carrier signal generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 or 220 may include various software modules.

2. Process Overview

Embodiments of processes for automated discovery of amenities will now be described in detail. It should be understood that the described processes may be embodied in one or more software modules that are executed by one or more hardware processors, e.g., as the application discussed above (e.g., server application 112, client application 134, and/or a distributed application comprising both server application 112 and client application 134), which may be executed wholly by processor(s) of platform 110, wholly by processor(s) of mobile device(s) 130, or may be distributed across platform 110 and mobile device(s) 130 such that some portions or modules of the application are executed by platform 110 and other portions or modules of the application are executed by mobile device(s) 130. The described process may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

In an embodiment, any set of one or more of the processes described herein may be implemented as a pluggable library that any host application can "plug in" to gain the benefits of those processes. Preferably, the effort required to "plug in" the library is minimal, for example, a few lines of code in the host application to initialize the library and turn it on to begin managing second radio system 132B (e.g., Wi-Fi™ radio system). In addition, the library may be provided with an application programming interface (API) that comprises a number of methods for the host application to use to gain greater control over the functions of the library. For example, the API may provide a method that allows the host application to extract a list of hotspot locations, so that the host application can display a map of the available hotspot locations.

As an alternative, various embodiments of the disclosed processes may be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

In other words, those of skill in the art will appreciate that the various illustrative logical blocks, modules, circuits, and method steps described herein, and the embodiments disclosed herein can often be implemented as electronic hardware, computer software, or combinations of both. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit, or step is for ease of description. Specific functions or steps can be moved from one module, block, or circuit to another without departing from the invention.

In many mobile devices, it is customary to have the cellular radio system (e.g., first radio system 132A) on all the time. The cellular radio system handles communications with the mobile service provider, including voice calls and/or text messages. If there are no connections available via other radio connections, the cellular radio system may also handle any data communication that the mobile device may require. However, in many mobile devices, the data communication is automatically switched over to the Wi-Fi™ radio system (e.g., second radio system 132B) when a connection to the Internet or other backend system or network is available through the Wi-Fi™ radio system. This is because, in most cases, it is less costly and uses less battery power to send data communications over the Wi-Fi™ radio system. Some mobile devices may be equipped with a Wi-Fi™ radio system that is able to communicate with two or more access points (e.g., using different Wi-Fi™ protocols).

The mobile device (e.g., via application 134) may turn on the Wi-Fi™ radio system only in certain circumstances, for example, when a Wi-Fi™ access point is likely to be available. When the Wi-Fi™ radio system is turned on, it will scan the environment to see what, if any, Wi-Fi™ access points are reachable within the environment, and whether or not those Wi-Fi™ access points require a password or other credentials to establish a connection. If there is an access point available to the mobile device, the mobile device will connect to it, for example, to offload at least some wireless services (e.g., data communications, Short Message Service (SMS) communications, and/or voice communications) from the cellular network (e.g., primary network 122A) to the Wi-Fi network (e.g., alternative network 122B).

Examples of such radio management may be found, for example, in U.S. Patent Pub. Nos. 2013/0322329, 2013/0322400, 2013/0322401, 2014/0293829, 2015/0189569, 2015/0189580, 2015/0189098, 2015/0282240, 2016/0192289, and 2016/0262201, the entireties of all of which are hereby incorporated herein by reference as if set forth in full.

In an embodiment, to alleviate user complaints, concerning the loss of control caused by active radio management, client application 134 monitors the user's interventions. For example, a user intervention may comprise the user taking control of the Wi-Fi™ for himself or herself, for instance, through a settings user interface provided by client application 134 or other software (e.g., a settings menu of the Android™ operating system). This may involve the user turning the Wi-Fi™ radio system (e.g., second radio system 132B) on or off and/or connecting or disconnecting from a Wi-Fi™ hotspot (e.g., connected via second radio system 132B). When such actions are taken, client application 134 may turn off its automated radio management, for a predetermined time period or based on one or more other conditions, and allow the user to take control of the Wi-Fi™ radio system on mobile device 130. This may provide a more symbiotic relationship between client application 134 and the user, enabling the user to take overriding control without permanently preventing client application 134 from identifying Wi-Fi™ opportunities.

2.1. Wi-Fi™ Radio System Turned Off when not Connected

In an embodiment, if a user turns off the Wi-Fi™ radio system (e.g., second radio system 132B) while it is not connected to any hotspot (e.g., no connection with access point 124B), client application 134 suspends its radio management for a predetermined time period (e.g., fifteen minutes), and then resumes the radio management following expiration of the predetermined time period. Alternatively, client application 134 may suspend its radio management until the mobile device is inactive (e.g., the display of mobile device 130 is turned off). As another alternative, client application 134 may suspend its radio management until the earlier of a predetermined time period (e.g., fifteen minutes) and the mobile device becoming inactive (e.g., display of mobile device 130 is turned off). In instances in which client application 134 suspends its radio management until the mobile device becomes inactive, client application 134 may wait until the mobile device has been inactive for at least a predetermined time period (e.g., one minute) before resuming the radio management.

Figure 3:
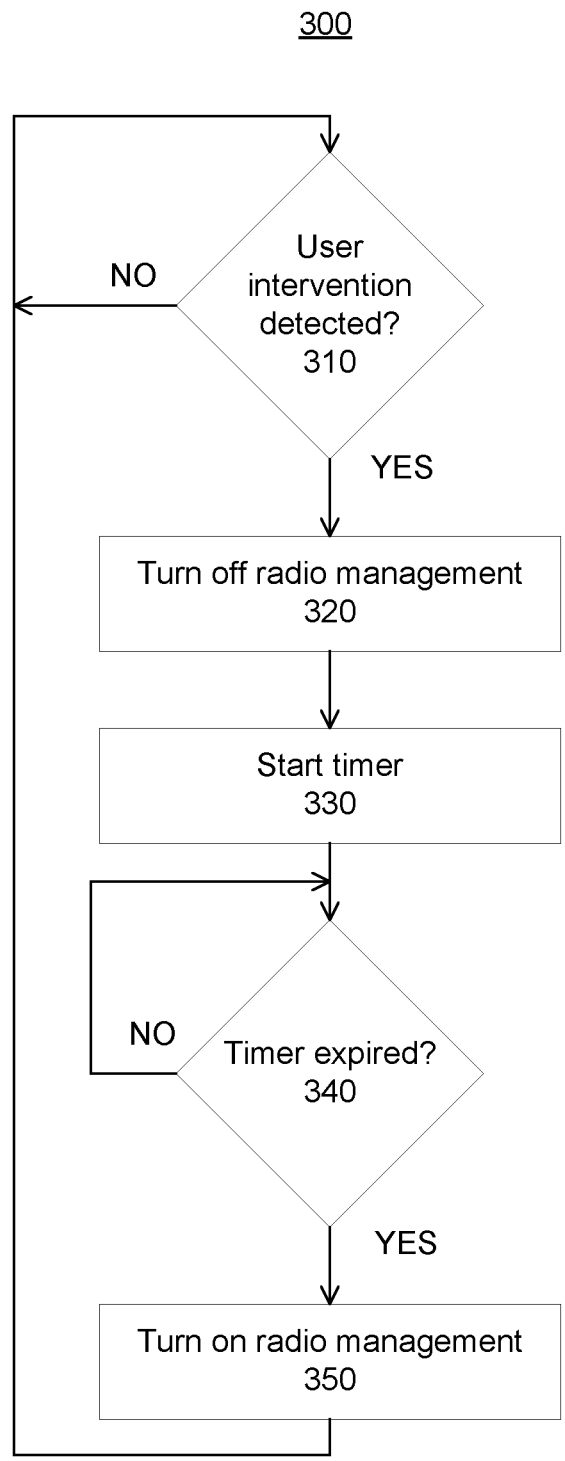
FIGS. 3-5 illustrate processes for radio management based on user intervention, according to embodiments.

FIG. 3 illustrates a process 300 for radio management based on user intervention, according to an embodiment. Process 300 may be implemented by client application 134.

In step 310, process 300 determines whether or not user intervention has been detected. User intervention may comprise a user manually disconnecting from a hotspot, turning off the radio management of client application 134, turning off the Wi-Fi™ radio system, a combination of user interventions (e.g., a certain sequence or pattern of user interventions), a certain number of user interventions (e.g., three or more user interventions of any type within a predetermined time period), and/or the like. If a user intervention is not detected (i.e., "NO" in step 310), process 300 may block (e.g., for a predetermined interval) until a user intervention is detected. On the other hand, if a user intervention is detected (i.e., "YES" in step 310), process 300 proceeds to step 320.

In step 320, process 300 turns off the automated radio management (e.g., of client application 134), and, in step 330, a timer (e.g., maintained by client application 134) is initiated.

In step 340, process 300 determines whether or not the timer has expired. If the timer has not expired (i.e., "NO" in step 340), process 300 blocks until the timer expires. On the other hand, if the timer has expired (i.e., "YES" in step 340), process 300 proceeds to step 350.

In step 350, process 300 turns the automated radio management (e.g., of client application 134) back on, and returns to step 310.

2.2. Wi-Fi™ Radio System Turned Off when Connected

Generally, if a user connects to a hotspot (e.g., using the Wi-Fi™ setting of the Android™ operating system) that has no Internet access or a non-traversable captive portal (e.g., hotel or motel Wi-Fi™ for which the user does not have proper credentials), the user will turn off the Wi-Fi™ radio system (e.g., second radio system 132B), since the hotspot is essentially unusable. In some radio management implementations, client application 134 will only suspend its radio management while the display of mobile device 130 is turned off, and will resume its radio management (i.e., turning the Wi-Fi™ back on) once the display is turned back on. With such an implementation, the Wi-Fi™ radio system will once again connect to the unusable hotspot, and may continue to do so every time the display is turned on, requiring the user to continually turn off the Wi-Fi™. This issue is affectionately called "motel hell."

In an embodiment, to address the "motel hell" problem, client application 134 may suspend its automated radio management for a predetermined time period and not resume the automated radio management until the predetermined time period has elapsed. As an example, the predetermined time period may be twelve hours. Notably, this may result in a user's own home Wi-Fi™ being suspended for the predetermined time period, if the user turns off the Wi-Fi™ while connected to his or her home access point (e.g., access point 124B). Thus, a user interface may be provided by client application 134 or other software (e.g., a settings menu of the Android™ operating system) with one or more inputs that enable the user to manually resume automated radio management by client application 134.

2.3. Wi-Fi™ Radio System Turned Off or Market HotSpot Forgotten when Connected In an embodiment, if the Wi-Fi™ radio system (e.g., second radio system 132B) is disconnected from a Wi-Fi™ access point (e.g., access point 124B representing a hotspot) that was configured (e.g., in the Android™ operating system), client application 134 determines whether or not the access point has been unconfigured (e.g., by a user selecting the "forget" option for the access point via the Android™ operating system). If the access point was unconfigured at the time of the disconnection, then this was likely a user intervention. Thus, in an embodiment, if client application 134 determines that the access point was unconfigured at the time of the disconnection, client application 134 suspends its automated radio management for at least a predetermined time period (e.g., thirty minutes). In addition, client application 134 may suspend its automated radio management for the later of the predetermined time period and the disappearance of the service set identifier (SSID) of the access point from a scan of the environment. In other words, client application 134 may suspend its automated radio management for at least the predetermined time period and for as long as the SSID of the access point is visible. Thus, for example, if the SSID is still visible after the predetermined time period, client application 134 will maintain its suspension of its automated radio management. However, as soon as the SSID is no longer visible after the predetermined time period, client application 134 may resume its automated radio management. Alternatively, client application 134 may wait until the SSID has not been detected for a predetermined time period (e.g., five minutes) before determining that the SSID is no longer visible.

The configuration or unconfiguration of an access point is sometimes also referred to as, respectively, "saving" or "forgetting" an SSID of the access point at the operating-system level. For example, within the Wi-Fi™ settings of the Android™ operating system, every time a user manually connects to a hotspot, that hotspot is automatically configured or saved in the operating system's list of hotspot opportunities. In the future, if the operating system identifies the saved hotspot in a scan of the environment by the Wi-Fi™ radio system, the operating system will attempt to connect to that hotspot. For example, a user would use this feature to connect to his or her home or work network access point once, such that the operating system will connect automatically every time it sees that network access point in the future. If the user manually selects the access point to be forgotten (e.g., by selecting the access point's SSID in the Wi-Fi™ settings of the Android™ operating system), the access point is unconfigured from the operating system.

Thus, the fact that the access point has been unconfigured or forgotten indicates that there was a user intervention.

Figure 4:
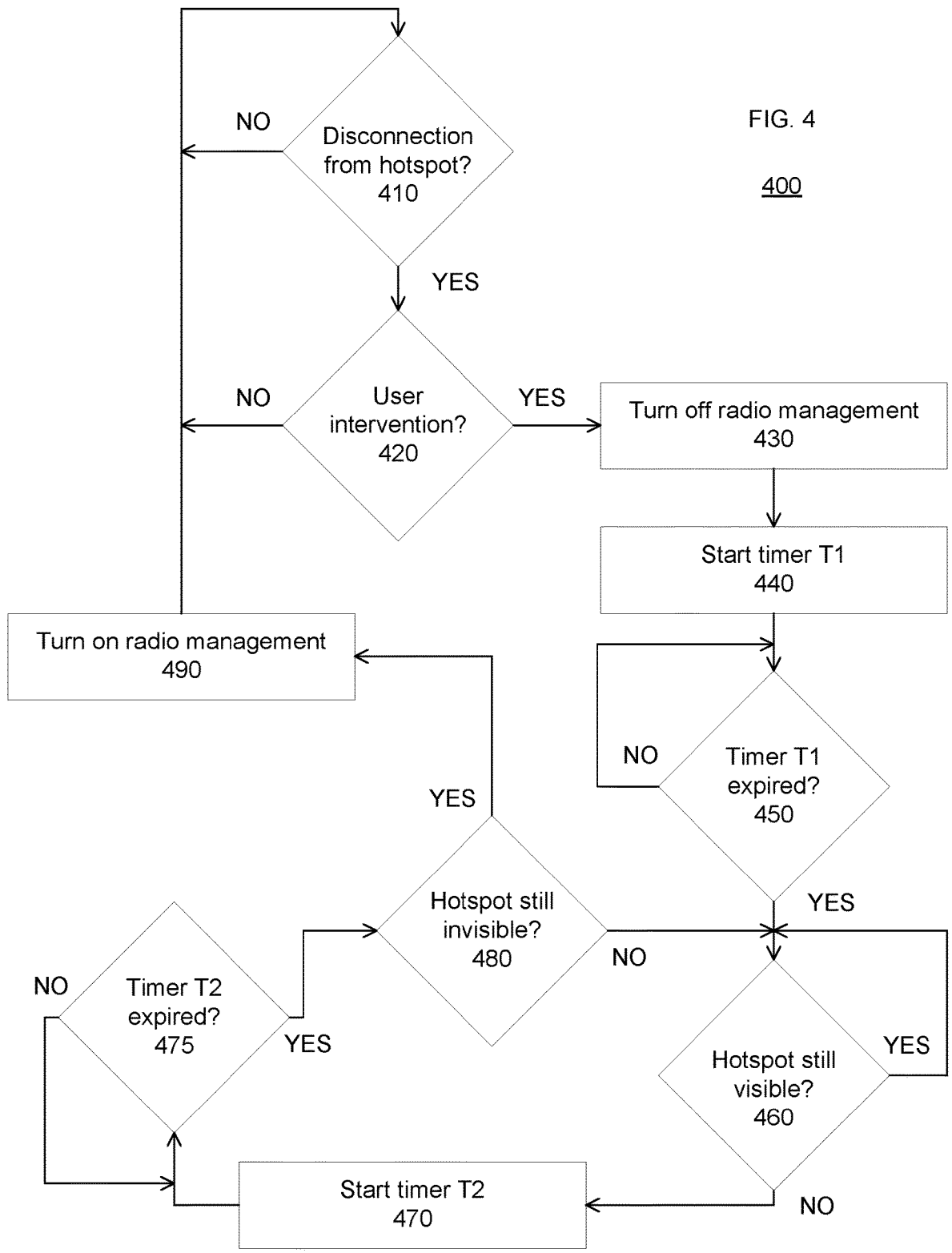

FIG. 4 illustrates a process 400 for radio management based on user intervention, according to an embodiment. Process 400 may be implemented by client application 134.

In step 410, process 400 determines whether or not a disconnection from a hotspot has occurred. If a disconnection has not occurred (i.e., "NO" in step 410), process 400 may block (e.g., for a predetermined interval) until a disconnection does occur. On the other hand, if a disconnection has occurred (i.e., "YES" in step 410), process 400 proceeds to step 420.

In step 420, process 400 determines whether or not the hotspot was disconnected by user intervention. This may comprise determining whether or not the hotspot has also been unconfigured or forgotten. For example, if the hotspot was forgotten while the Wi-Fi™ radio system (e.g., second radio system 132B) was on, this would indicate that the user intervened to manually forget the hotspot. Additionally or alternatively, this may comprise determining whether or not the Wi-Fi™ radio system (e.g., second radio system 132B) was turned off. For example, if the Wi-Fi™ radio system was turned off while it was connected to the hotspot, this would indicate that the user intervened to manually disconnect the Wi-Fi™ radio system from the hotspot. If the disconnection was not caused by user intervention (i.e., "NO" in step 420), process 400 may return to step 410. On the other hand, if the disconnection was caused by user intervention (i.e., "YES" in step 420), process 400 proceeds to step 430.

In step 430, process 400 turns off the automated radio management (e.g., of client application 134), and, in step 440, a first timer (e.g., maintained by client application 134) is initiated.

In step 450, process 400 determines whether or not the first timer has expired. If the first timer has not expired (i.e., "NO" in step 450), process 400 blocks until the first timer expires. On the other hand, if the first timer has expired (i.e., "YES" in step 450), process 400 proceeds to step 460. The time period defined by steps 440 and 450 can be any duration (e.g., thirty minutes, one hour, etc.).

In step 460, process 400 determines whether or not the hotspot, which was determined to have been disconnected in step 410 and forgotten in step 420, is still visible. If the hotspot is still visible, process 400 may block until the hotspot is no longer visible. On the other hand, if the hotspot is no longer visible, process 400 proceeds to step 470.

In step 470, a second timer (e.g., maintained by client application 134) is initiated, and, in step 475, process 400 determines whether or not the second timer has expired. If the second timer has not expired (i.e., "NO" in step 475), process 400 blocks until the second timer expires. On the other hand, if the second timer has expired (i.e., "YES" in step 475), process 400 proceeds to step 480.

In step 480, process 400 determines whether or not the hotspot, which was determined to have been disconnected in step 410, forgotten in step 420, and no longer visible in step 460, is still not visible. If the hotspot has become visible again (i.e., "NO" in step 480), process 400 returns to step 460. On the other hand, if the hotspot is still not visible (i.e., "YES" in step 480), process 400 proceeds to step 490. Steps 470-480 ensure that mobile device 130 has truly left the coverage area of the hotspot. The time period defined by steps 470 and 475 can be any duration (e.g., five minutes, thirty minutes, one hour, etc.), and may be the same as or different than the time period defined by steps 440 and 450.

In step 490, process 400 turns the automated radio management (e.g., of client application 134) back on, and returns to step 410. According to process 400, the automated radio management is turned off until the hotspot has been forgotten for a first predetermined time period (e.g., defined by steps 440 and 450) and the hotspot has not been visible for a second predetermined time period (e.g., defined by steps 470 and 475). It should be understood that the determination of whether or not a hotspot is visible (e.g., steps 460 and 480) may be performed by scanning an environment of mobile device 130 (e.g., using second radio system 132B).

2.4. Repeated User Intervention

In an embodiment, after a predetermined number (e.g., three) of user interventions—e.g., involving a user manually disconnecting from an access point (e.g., access point 124B) or turning off the Wi-Fi™ radio system (e.g., second radio system 132B) while connected to the access point—client application 134 blacklists the access point for at least a predetermined time period (e.g., one day, two weeks, etc.) or permanently. Specifically, client application 134 may blacklist at least the basic service set identifier (BSSID) of the access point. In addition, client application 134 may blacklist the SSID of the access point. However, the SSID may be blacklisted for less time than the BSSID (e.g., twenty-four hours for the SSID as opposed to two weeks for the BSSID). Furthermore, client application 134 may blacklist, not just the particular access point to which mobile device 130 is connected, but every access point (e.g., by BSSID and/or SSID) that is visible during the user intervention(s) (e.g., via a scan of the environment by the Wi-Fi™ radio system).

In an embodiment, client application 134 may blacklist the access point—and optionally, all visible access points—only when the user intervention occurs the predetermined number of times in the same location (e.g., as determined by retrieving GPS coordinates, indicating the current location of mobile device 130, at the time of each user intervention).

In an embodiment, the reaction by client application 134 to the user interventions is escalated depending on the number of user interventions and/or the number of times that an access point is blacklisted. Specifically, the higher the number of user interventions and/or blacklistings, the stronger the reaction.

For example, if an access point (and optionally all visible access points at a location) is initially blacklisted due to a first predetermined number (e.g., three) of user interventions, the access point (and optionally all visible access points at the location) may be blacklisted for a first predetermined time period. After the first predetermined time period, if the same access point (and optionally all visible access points at the location) is blacklisted again due to a second predetermined number (e.g., one) of user interventions, the access point (and optionally all visible access points at the location) may be blacklisted for a second predetermined time period. The second predetermined time period may be the same as or different (e.g., longer) than the first predetermined time period. After a predetermined number of user interventions or a predetermined number of blacklistings, the access point (and optionally all visible access points at the location) may be permanently blacklisted.

For purposes of illustration, a more concrete, non-limiting example and scenario will now be described. At a particular location, over a period of a week, the user intervenes to disconnect from the same hotspot a total of three times. In response to the number of user interventions for the hotspot reaching three, client application 134 blacklists the BSSIDs of the hotspot and all visible hotspots at the location for two weeks and blacklists the SSIDs of the hotspot and all visible hotspots at the location for twenty-four hours. Subsequently, each time the user intervenes to disconnect from the same hotspot, client application 134 blacklists the BSSIDs of the hotspot and all visible hotspots at the location for two weeks and blacklists the SSIDs of the hotspot and all visible hotspots at the location for twenty-four hours. These extensions of the prior blacklistings may be cumulative (i.e., summed to the previous and remaining blacklist times) or non-cumulative (i.e., the two-week and twenty-four hour periods simply restart each time). After six total user interventions, client application 134 permanently blacklists the BSSIDs of the hotspot and all visible hotspots at the location and blacklists the SSIDs of the hotspot and all visible hotspots at the location for two weeks. Thereafter, each time the user intervenes on the same SSID, irrespective of location, client application 134 blacklists the SSID for two weeks.

Figure 5:
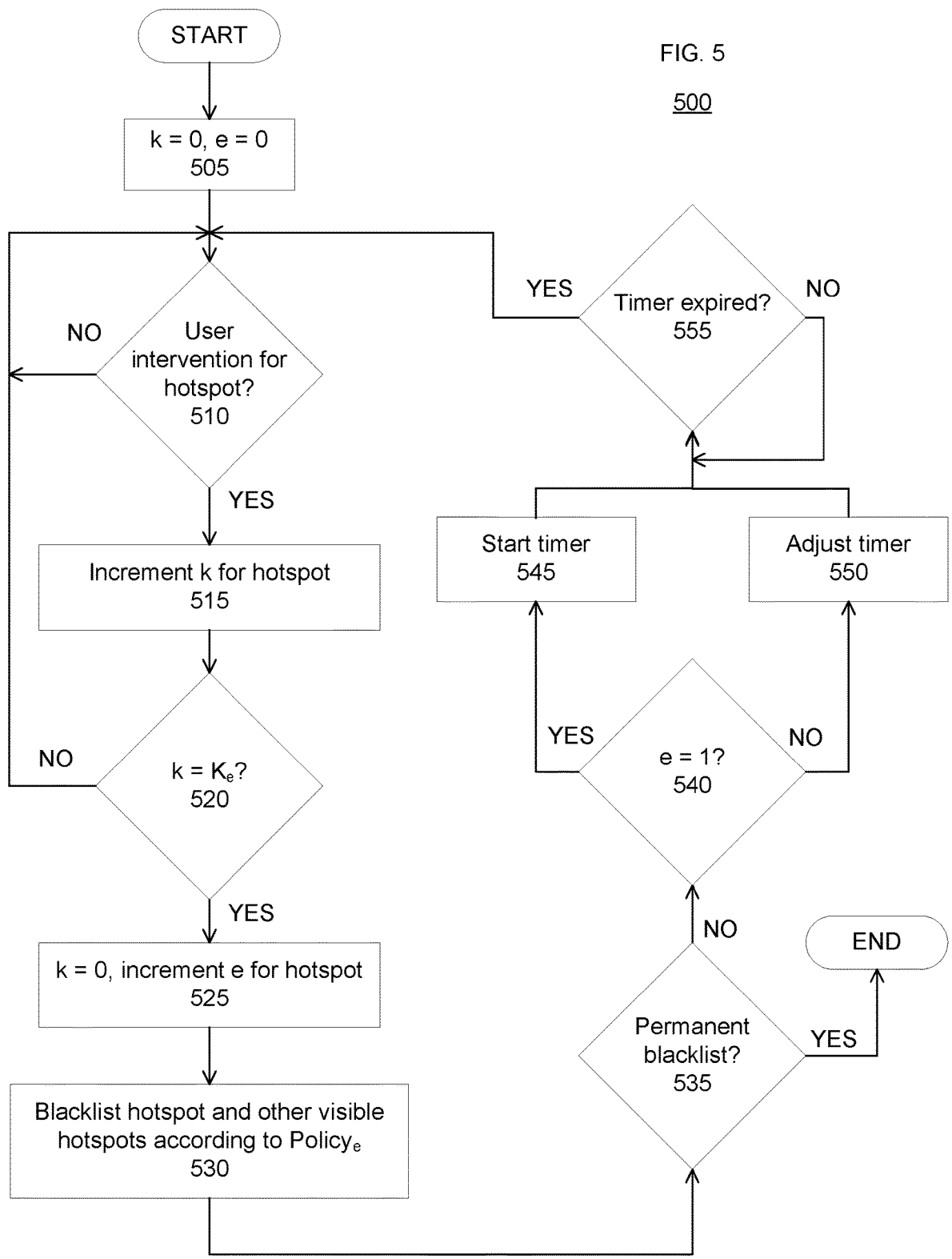

FIG. 5 illustrates a process 500 for radio management based on user intervention, according to an embodiment. Process 500 may be implemented by client application 134.

In step 505, variable k, which represents a number of user interventions for a given hotspot, and variable e, which represents an escalation level for the given hotspot, are both initialized to zero for the given hotspot.

In step 510, process 500 determines whether or not a user intervention has been detected for the given hotspot. User intervention may comprise a user manually disconnecting from a hotspot, turning off the radio management of client application 134, and/or turning off the Wi-Fi™ radio system. If a user intervention has not occurred (i.e., "NO" in step 510), process 500 may block (e.g., for a predetermined interval) until a user intervention does occur. On the other hand, if a user intervention has occurred (i.e., "YES" in step 510), process 500 proceeds to step 515.

In step 515, process 500 increments variable k for the hotspot.

In step 520, process 500 determines whether or not the variable k has reached a maximum for an escalation level represented by variable e. If the variable k has not reached the maximum for the escalation level (i.e., "NO" in step 520), process 500 may return to step 510. On the other hand, if the variable k has reached the maximum for the escalation level (i.e., "YES" in step 520), process 500 proceeds to step 525.

In step 525, variable k for the hotspot is reinitialized to zero, and variable e is incremented for the hotspot.

In step 530, the hotspot—and, in some embodiments, other visible hotspots at the same location—are blacklisted according to an escalation policy for the escalation level represented by variable e. In an embodiment, the escalation policy for one or more of the escalation levels may comprise blacklisting the BSSID of the hotspot for a first time period, and/or blacklisting the SSID of the hotspot for a second time period that may be different than the first time period. These escalation policies may also comprise blacklisting the BSSIDs of the other visible hotspots at the same location for a third time period, which may be the same as or different than the first time period, and/or blacklisting the SSIDs of the other visible hotspots at the same location for a fourth time period, which may be the same as or different than the second time period. At a higher escalation level, including potentially the highest escalation level, the BSSID and/or the SSID of the hotspot—and, in some embodiments, the other visible hotspots at the same location—may be permanently blacklisted. It should be understood that, in such a case, the BSSID(s) may be permanently blacklisted, while the SSID(s) are only temporary blacklisted for a predetermined time period. While a BSSID or SSID is blacklisted, client application 134 will not, during its automated radio management, attempt to automatically connect to the hotspot identified by the BSSID or SSID.

In step 535, process 500 determines whether or not the escalation policy from step 530 requires a permanent blacklist of the hotspot. If the escalation policy does require a permanent blacklist (i.e., "YES" in step 535), process 500 ends. On the other hand, if the escalation policy does not require a permanent blacklist, process 400 proceeds to step 540.

In step 540, process 500 determines whether variable e represents the first level of escalation. If variable e represents the first level of escalation, process 400 starts a timer (e.g., maintained by client application 134) in step 545. If variable e does not represent the first level of escalation, process 500 adjusts the existing timer in step 550. Adjusting the existing timer may involve adding additional time to the timer (e.g., in an implementation in which the timer counts down to zero), subtracting time from the timer (e.g., in an implementation in which the timer counts up), and/or resetting the timer.

In step 555, process 500 determines whether or not the timer has expired. If the timer has not expired (i.e., "NO" in step 555), process 500 blocks until the timer expires. On the other hand, if the timer has expired (i.e., "YES" in step 555), process 500 may remove the hotspot(s) from the blacklist (e.g., by removing the BSSID and/or SSID of each hotspot associated with the timer from a stored blacklist) and return to step 510.

It should be understood that all of the processes described above (e.g., processes 300, 400, and 500) or any set of two or more of these processes may be combined into a single embodiment (e.g., of client application 134). Alternatively, an embodiment may implement only a single one of the above processes. Furthermore, each of these processes (e.g., processes 300, 400, and/or 500) may be implemented with fewer, more, or different steps and/or a different arrangement of steps than those illustrated.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for a mobile device comprising a first radio system and a second radio system and capable of performing radio management of at least the second radio system, the method comprising using at least one hardware processor to:
   detect at least one user intervention in the automated radio management of the second radio system;
   in response to the detection of the at least one user intervention, automatically restrict the automated radio management of the second radio system for at least a predetermined time period, by one or both of turning off the automated radio management of the second radio system, and adding an access point, to which the second radio system was connected at a time of the at least one user intervention, to a blacklist; and, after the predetermined time period has expired, automatically reverse the restriction to the automated radio management of the second radio system;

wherein detecting the at least one user intervention comprises detecting at least one disconnection from the access point, and, in response to the detection of each disconnection from the access point, automatically, determining whether or not the access point has been forgotten by an operating system of the mobile device, and, when the access point is determined to have been forgotten by the operating system of the mobile device, determining that a user intervention has occurred.

2. The method of claim 1, wherein detecting at least one user intervention comprises detecting a predetermined number of two or more user interventions prior to automatically restricting the automated radio management.

3. The method of claim 1, further comprising using the at least one hardware processor to, after reversal of a prior restriction to the automated radio management in a past time period, automatically escalate the restriction to the automated radio management that is performed in response to the detection of the at least one user intervention in at least one subsequent time period.

4. The method of claim 3, wherein escalating the restriction to the automated radio management comprises lengthening the predetermined time period.

5. The method of claim 3, wherein escalating the restriction to the automated radio management comprises permanently adding the access point to the blacklist.

6. The method of claim 1, wherein restricting the automated radio management comprises adding the access point, to which the second radio system was connected at the time of the at least one user intervention, to the blacklist and adding all other access points, at a same location as the access point and visible in a scan by the second radio system of an environment of the mobile device, to the blacklist.

7. The method of claim 1, wherein restricting the automated radio management comprises adding one or both of a service set identifier (SSID) and basic SSID (BSSID) of the access point to the blacklist.

8. A method for a mobile device comprising a first radio system and a second radio system and capable of performing radio management of at least the second radio system, the method comprising using at least one hardware processor to:

detect at least one user intervention in the automated radio management of the second radio system;

in response to the detection of the at least one user intervention, automatically restrict the automated radio management of the second radio system for at least a predetermined time period, by one or both of turning off the automated radio management of the second radio system, and adding an access point, to which the second radio system was connected at a time of the at least one user intervention, to a blacklist; and, after the predetermined time period has expired, automatically reverse the restriction to the automated radio management of the second radio system;

wherein restricting the automated radio management comprises adding one or both of a service set identifier (SSID) and basic SSID (BSSID) of the access point to the blacklist; and wherein restricting the automated radio management for at least a predetermined time period comprises including the BSSID in the blacklist for a first predetermined time period and including the SSID in the blacklist for a second predetermined time period that is different than the first predetermined time period.

9. The method of claim 1, wherein restricting the automated radio management for at least a predetermined time period comprises, after expiration of the predetermined time period, continuing to restrict the automated radio management until the access point, to which the second radio system was connected at the time of the at least one user intervention, is no longer visible in a scan by the second radio system of an environment of the mobile device.

10. The method of claim 1, wherein restricting the automated radio management for at least a predetermined time period comprises, after expiration of a first predetermined time period, continuing to restrict the automated radio management until the access point, to which the second radio system was connected at the time of the at least one user intervention, has not been visible in a scan by the second radio system of an environment of the mobile device for at least a second predetermined time period.

11. The method of claim 10, wherein the second predetermined time period is different than the first predetermined time period.

12. A mobile device comprising:
a first radio system;
a second radio system;
at least one hardware processor; and
one or more software modules configured to, when executed by the at least one hardware processor,
perform automated radio management of the second radio system,
detect at least one user intervention in the automated radio management of the second radio system,
in response to the detection of the at least one user intervention, automatically restrict the automated radio management of the second radio system for at least a predetermined time period, by one or both of turning off the automated radio management of the second radio system, and adding an access point, to which the second radio system was connected at a time of the at least one user intervention, to a blacklist, and,
after the predetermined time period has expired, automatically reverse the restriction to the automated radio management of the second radio system;
wherein detecting the at least one user intervention comprises
detecting at least one disconnection from the access point, and,
in response to the detection of each disconnection from the access point, automatically, determining whether or not the access point has been forgotten by an operating system of the mobile device, and, when the access point is determined to have been forgotten by the operating system of the mobile device, determining that a user intervention has occurred.

13. The mobile device of claim 12, wherein detecting at least one user intervention comprises detecting a predetermined number of two or more user interventions prior to automatically restricting the automated radio management.

14. The mobile device of claim 12, wherein restricting the automated radio management comprises adding one or both of a service set identifier (SSID) and basic SSID (BSSID) of the access point to the blacklist.

15. A non-transitory computer-readable medium having instructions stored therein, wherein the instructions, when executed by a processor, cause the processor to:
perform automated radio management of a radio system;
detect at least one user intervention in the automated radio management of the radio system;
in response to the detection of the at least one user intervention, automatically restrict the automated radio management of the radio system for at least a predetermined time period, by one or both of turning off the automated radio management of the radio system, and adding an access point, to which the radio system was connected at a time of the at least one user intervention, to a blacklist; and,
after the predetermined time period has expired, automatically reverse the restriction to the automated radio management of the radio system;
wherein detecting the at least one user intervention comprises
detecting at least one disconnection from the access point, and,
in response to the detection of each disconnection from the access point, automatically, determining whether or not the access point has been forgotten by an operating system of the mobile device, and, when the access point is determined to have been forgotten by the operating system of the mobile device, determining that a user intervention has occurred.

16. The non-transitory computer-readable medium of claim 15, wherein detecting at least one user intervention comprises detecting a predetermined number of two or more user interventions prior to automatically restricting the automated radio management.

17. The non-transitory computer-readable medium of claim 15, wherein restricting the automated radio management comprises adding one or both of a service set identifier (SSID) and basic SSID (BSSID) of the access point to the blacklist.

* * * * *